United States Patent
Kobayashi et al.

(10) Patent No.: US 6,900,564 B2
(45) Date of Patent: May 31, 2005

(54) ELECTRIC POWER STEERING SYSTEM (75) Inventors: Masanori Kobayashi, Nara (JP); Takeo Iino, Kashiwara (JP); Akihiko Shiina, Kashihara (JP); Katsutoshi Nishimura, Yamatotakada (JP); Ken-ichiroh Aoto, Kashiwara (JP); Yoshio Itou, Tondabayashi (JP); Masashi Uota, Yamatokooriyama (JP); Shoji Shibamura, Kashiwara (JP); Tetsuya Murakami, Nara (JP); Hiroyuki Shigemura, Kashiwara (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/172,949

(22) Filed: Jun. 18, 2002

(65) Prior Publication Data
US 2002/0195893 A1 Dec. 26, 2002

(30) Foreign Application Priority Data

Jun. 20, 2001 (JP) .................................. 2001-186853
Apr. 24, 2002 (JP) .................................. 2002-122665

(51) Int. Cl.$^7$ ........................... H02K 7/116; B62D 5/04
(52) U.S. Cl. ............................. 310/83; 310/90; 310/91; 180/444
(58) Field of Search ............................. 310/83, 90, 91, 310/51, 99; 180/444, 428

(56) References Cited

U.S. PATENT DOCUMENTS

| | | | |
|---|---|---|---|
| 4,227,104 A | | 10/1980 | Hamman |
| 4,815,329 A | | 3/1989 | Ansgar et al. |
| 5,414,316 A | * | 5/1995 | Michel et al. ................. 310/90 |
| 5,454,438 A | * | 10/1995 | Chikuma ..................... 180/444 |
| 5,605,071 A | * | 2/1997 | Buchanan, Jr. ............... 74/425 |
| 6,357,313 B1 | * | 3/2002 | Appleyard .............. 74/388 PS |
| 6,364,049 B1 | * | 4/2002 | Iwasaki et al. ............. 180/444 |
| 6,412,591 B1 | * | 7/2002 | Endo et al. .................. 180/427 |
| 6,491,131 B1 | * | 12/2002 | Appleyard ................... 180/444 |
| 6,550,567 B2 | * | 4/2003 | Murakami et al. .......... 180/444 |

FOREIGN PATENT DOCUMENTS

| | | | | |
|---|---|---|---|---|
| DE | 2748011 A1 | | 5/1978 | |
| DE | 10201866 A1 | | 7/2002 | |
| EP | 0420131 A1 | * | 9/1990 | ............ B62D/5/04 |
| EP | 1069330 A2 | | 1/2001 | |
| FR | 1397632 | | 4/1965 | |
| GB | 2016213 | | 9/1979 | |
| JP | 05-338543 | | 12/1993 | |
| JP | 2000159128 | * | 6/2000 | ............ B62D/5/04 |
| WO | WO-99/11502 | * | 11/1999 | ............ B62D/5/04 |
| WO | WO-99/65758 | * | 12/1999 | ............ B62D/5/04 |

OTHER PUBLICATIONS

European Search Report.

* cited by examiner

Primary Examiner—Darren Schuberg
Assistant Examiner—David W. Scheuermann
(74) Attorney, Agent, or Firm—Rabin & Berdo, P.C.

(57) ABSTRACT

An electric power steering system is provided, which comprises a steering assist electric motor, and a reduction gear mechanism for reducing a rotation speed of a rotatable shaft of the electric motor. The reduction gear mechanism comprises a worm shaft driven by the rotatable shaft, and a worm wheel driven by the warm shaft. The electric power steering system further comprises a joint for coupling the rotatable shaft to the worm shaft for transmission of a driving force. Longitudinally biasing means is provided in association with the joint for longitudinally biasing the worm shaft.

4 Claims, 6 Drawing Sheets

ELECTRIC POWER STEERING SYSTEM

CROSS REFERENCE TO RELATED APPLICATION

This application claims priority benefits under 35 USC §119 on the basis of Japanese Patent Applications No.2001-186853 and No.2002-122665, the disclosure of which is incorporated herein by reference.

BACKGROUND OF THE INVENTION

1. Field of the Invention

The present invention relates to an electric power steering system employing an electric motor as a source of a steering assist force.

2. Description of Related Art

Electric power steering systems for motor vehicles are generally adapted to control the output rotation of an electric motor according to a steering torque applied to a steering member such as a steering wheel when the steering member is rotated for operation. The rotation of the electric motor is transmitted to a steering mechanism via a reduction gear mechanism to assist the operation of the steering mechanism according to the rotative operation of the steering member, whereby a steering effort of a driver can be alleviated.

A combination of a worm and a worm wheel is provided as the reduction gear mechanism. A worm shaft provided with the worm is rotatably supported with longitudinally opposite ends thereof held by a pair of bearings. However, noises are often caused by rattle (or play) due to internal clearances of the bearings.

Therefore, a pair of ball bearings are employed as the bearings, and a preload is applied longitudinally thereto for elimination of the longitudinal internal clearances. However, the use of the two ball bearings results in higher costs.

On the other hand, a mechanism for elimination of backlash between the worm shaft and the worm wheel is employed, which is adapted to bias one end of the worm shaft radially toward the worm wheel. In this case, the one end of the worm shaft is radially movable. Even with the use of a ball bearing, this makes it difficult to apply a preload to the ball bearing.

SUMMARY OF THE INVENTION

It is therefore an object of the present invention to provide an electric power steering system which can suppress the noises caused due to the clearances in the bearings at lower costs.

In accordance with a preferred aspect of the present invention to achieve the aforesaid object, there is provided an electric power steering system, which comprises: a steering assist electric motor; a reduction gear mechanism for reducing a rotation speed of a rotation shaft of the electric motor, the reduction gear mechanism comprising a worm shaft driven by the rotation shaft of the electric motor, and a worm wheel driven by the warm shaft; a joint for coupling the rotation shaft of the electric motor to the worm shaft for transmission of a driving force; and longitudinally biasing means provided in association with the joint for longitudinally biasing the worm shaft.

In general, one end of the worm shaft is rotatably supported by a rolling bearing. In this embodiment, the worm shaft is axially biased to apply a preload to the rolling bearing. Therefore, the noises can be prevented, which may otherwise occur due to an internal clearance of the rolling bearing.

DESCRIPTION OF THE PREFERRED EMBODIMENTS

Preferred embodiments of the present invention will hereinafter be described with reference to the attached drawings.

Figure 1:
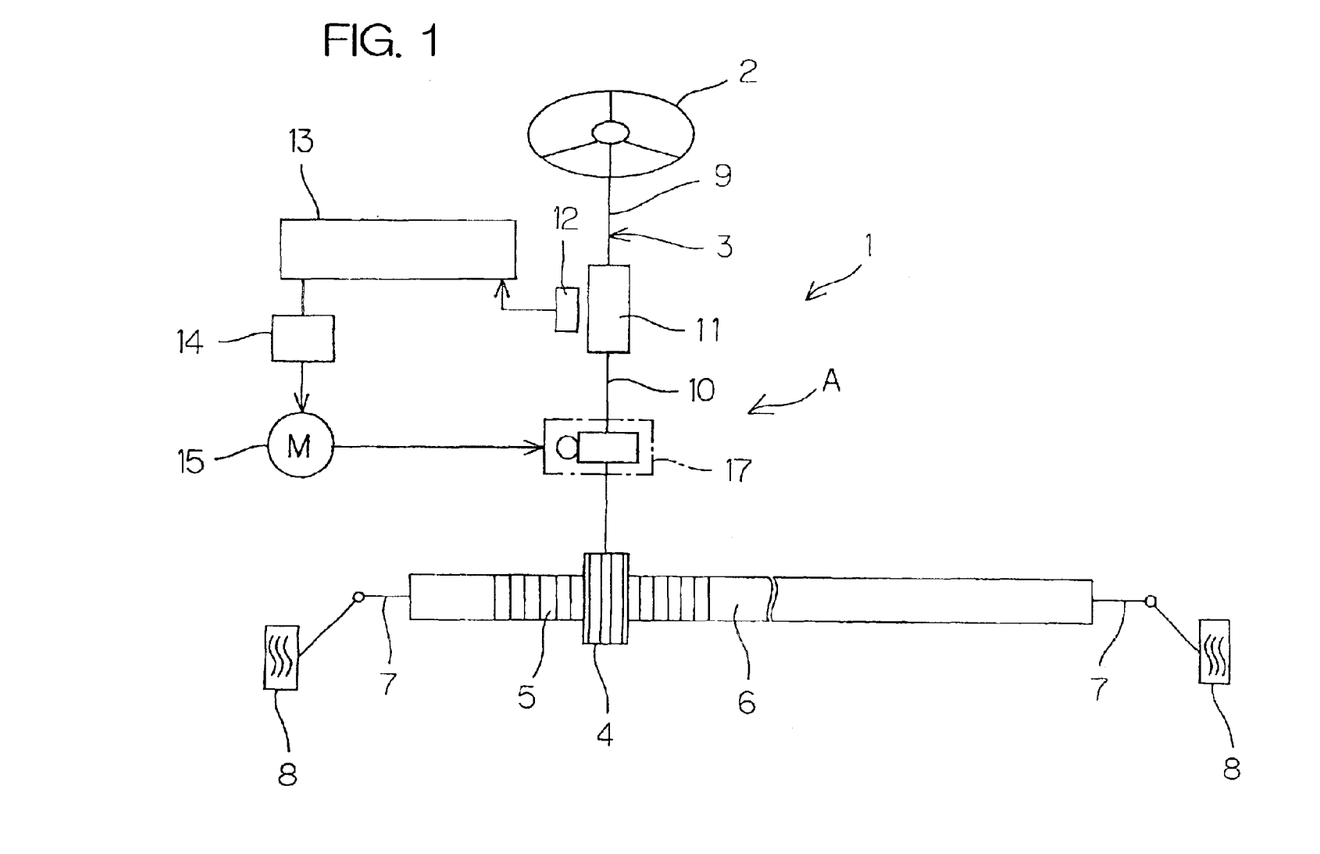
FIG. 1 is a schematic diagram illustrating the construction of an electric power steering system according to one embodiment of the present invention.

FIG. 1 is a schematic diagram illustrating the construction of an electric power steering system according to one embodiment of the present invention. Referring to FIG. 1, the electric power steering system 1 includes a steering member 2 such as a steering wheel to be rotated for operation, and a steering transmission system A for turning vehicle wheels 8 for steering according to the rotative operation of the steering member 2. In the electric power steering system according to the embodiment herein described, the steering member 2 is mechanically coupled to the vehicle wheels 8. However, the present invention is applicable to a vehicle steering system of a so-called steer-by-wire type which has no mechanical coupling between the steering member 2 and the vehicle wheels 8.

The steering member 2 is coupled to a steering shaft 3 in a co-rotatable manner. A pinion gear 4 is provided at a distal end of the steering shaft 3, and meshed with a rack gear 5 of a rack shaft 6 extending transversely of a motor vehicle.

Tie rods 7 are respectively coupled to opposite ends of the rack shaft 6, and further coupled to the corresponding vehicle wheels 8 via corresponding knuckle arms (not shown). When the steering member 2 is rotated to rotate the steering shaft 3, the rotation of the steering shaft 3 is converted into a linear movement of the rack shaft 6 transverse to the motor vehicle by the pinion gear 4 and the rack gear 5. Thus, the vehicle wheels 8 are turned.

The steering shaft 3 is divided into a cylindrical first steering shaft 9 connected to the steering member 2 and a second steering shaft 10 connected to the pinion gear 4. The first and second steering shafts 9, 10 are coupled to each other in an axially aligned relation by a torsion bar 11.

A torque sensor 12 is provided for detecting a steering torque on the basis of a relative rotational displacement of the first steering shaft 9 and the second steering shaft 10 connected to each other via the torsion bar 11, and the torque detected by the torque sensor 12 is applied to a control section 13. The control section 13 controls a voltage to be applied to a steering assist electric motor 15 via a driver 14 on the basis of the detected torque. The rotation of a rotatable shaft 16 (see FIG. 2) of the electric motor 15 is transmitted to the second steering shaft 10 via a reduction gear mechanism 17 including a worm mechanism for assisting a steering operation.

Figure 2:
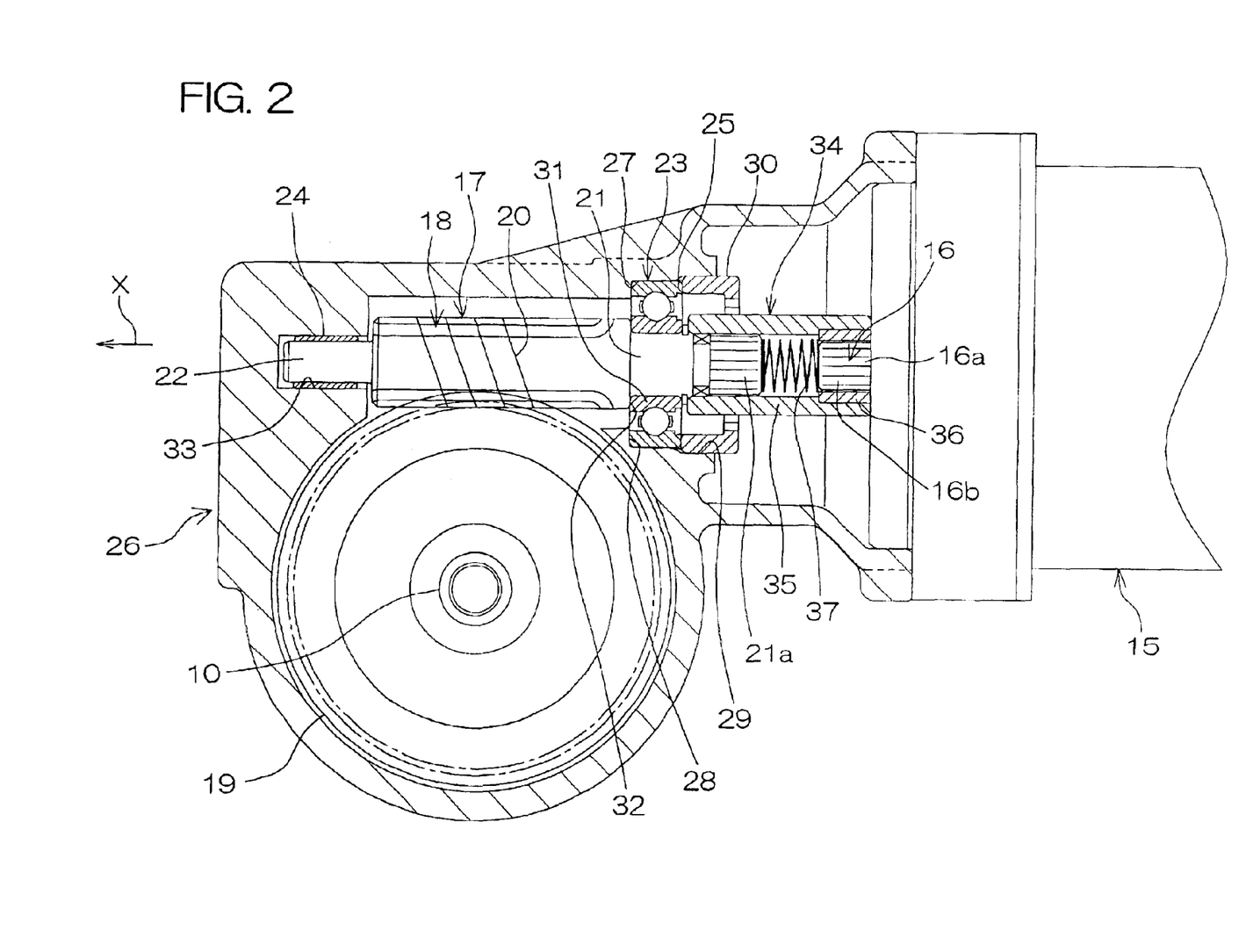
FIG. 2 is a sectional view illustration a major portion of the electric power steering system including a backlash adjustment mechanism.

Referring to FIG. 2, the reduction gear mechanism 17 includes a worm shaft 18 and a worm wheel 19 which are meshed with each other. The worm shaft 18 is coaxially connected to the rotatable shaft 16 of the electric motor 15. The worm shaft 18 includes a worm tooth 20 unitarily formed on a longitudinally middle portion thereof. The worm wheel 19 is engaged with the second steering shaft 10 in a co-rotatable manner. The worm wheel 19 has teeth formed of a polyacetal resin (POM) or a polyamide resin (PA).

The worm shaft 18 is disposed as crossing the axis of the second steering shaft 10. The worm shaft 18 has longitudinally opposite first and second end portions 21, 22. The first and second end portions 21 and 22 are rotatably supported by first and second bearings 23 and 24, respectively.

The first bearing 23 is a ball bearing. An outer ring 25 of the first bearing 23 is fitted in a bearing hole 27 of a gear housing 26 which houses the reduction gear mechanism 17. One end of the outer ring 25 of the first bearing 23 is positioned in abutment against a positioning step 28 of the gear housing 26. A positioning thread member 30 is threadingly engaged with a thread hole 29 which communicates with the bearing hole 27. The positioning thread member 30 abuts against the other end of the outer ring 25 to position the outer ring 25 with respect to the positioning step 28.

On the other hand, an inner ring 31 of the first bearing 23 is fixed around the first end portion 21 of the worm shaft 18. One end of the inner ring 31 of the first bearing 23 abuts against a positioning step 32 of the worm shaft 18 to restrict the movement of the first bearing 23 in the direction of an arrow X. The movement of the first bearing 23 in the direction of an arrow Y is restricted, for example, by an E-type stop ring 40 engaged with a groove 21b formed in the first end portion 21 of the worm shaft 18.

The second bearing 24 is a sliding bearing such as a metal bush which is press-fitted in a bearing hole 33 of the gear housing 26. Usable as the second bearing 24 is a bearing of a type which does not restrict the axial movement of the worm shaft 18. Besides the aforesaid sliding bearing, a cylindrical roller bearing such as a needle roller bearing may be employed.

The first end portion 21 of the worm shaft 18 is coupled to an end portion 16a of the rotatable shaft 16 of the electric motor 15 in a co-rotatable manner via a joint 34. The joint 34 connects the rotatable shaft 16 to the worm shaft 18 in axially aligned relation for transmission of the rotation of the rotatable shaft 16 to the worm shaft 18.

Figure 3:
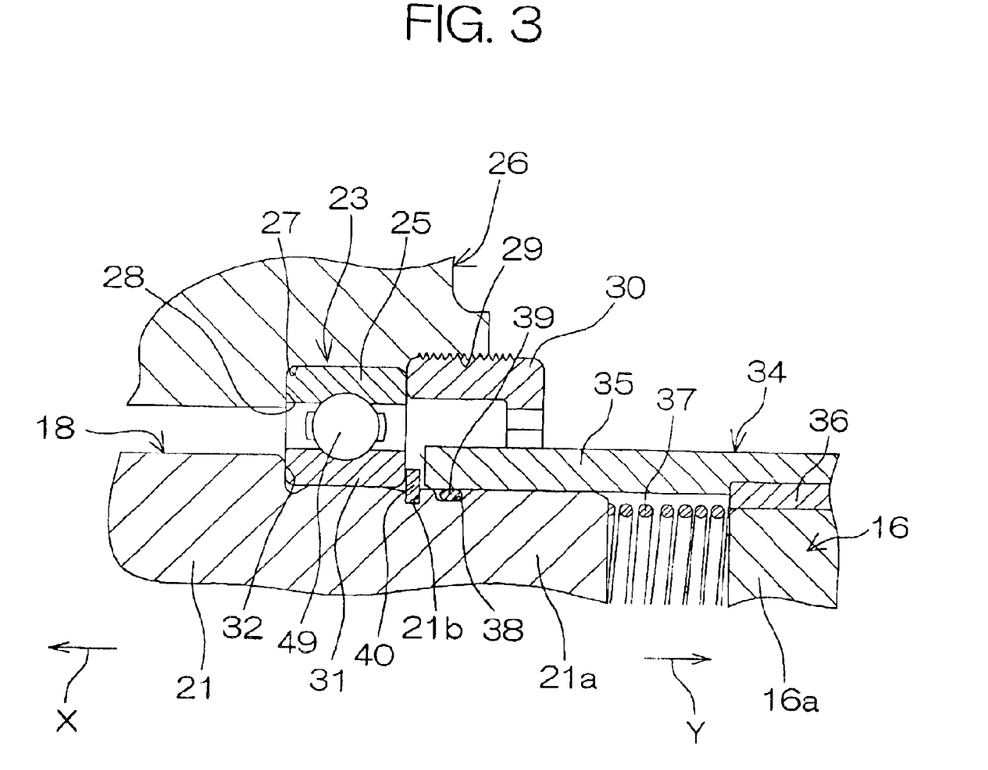
FIG. 3 is an enlarged diagram illustrating a major portion shown in FIG. 2.

Referring to FIG. 2 and FIG. 3 which is an enlarged diagram of FIG. 2, the joint 34 is in spline engagement with a spline portion 21a on the first end portion 21 of the worm shaft 18, and in serration engagement with a serration portion 16b on the end portion 16a of the rotatable shaft 16. The joint 34 has a greater diameter sleeve 35. The spline portion 21a on the first end portion 21 of the worm shaft 18 is fitted in one end portion of the greater diameter sleeve 35 for the spline engagement.

A smaller diameter sleeve 36 is press-fitted in the other end portion of the greater diameter sleeve 35. The serration portion 16b on the end portion 16a of the rotatable shaft 16 is fitted in the smaller diameter sleeve 36 for the serration engagement.

The joint 34 is prevented from being axially moved with respect to the rotatable shaft 16, while permitting the longitudinal movement of the worm shaft 18. Longitudinally biasing means such as a compression coil spring 37 is housed in the greater diameter sleeve 35. The compression coil spring 37 is interposed between the end 16a of the rotatable shaft 16 and the end 21 of the worm shaft 18 which are opposed to each other for longitudinally biasing the worm shaft 18 toward the side of the second end 22 (i.e., in the direction of the arrow X), whereby a preload is applied to the first bearing (ball bearing) 23 for elimination of an internal clearance of the fist bearing 23.

Referring to FIG. 3, an annular groove 38 is formed in the vicinity of the spline portion 21a in the first end portion 21 of the worm shaft 18. An elastic member 39 such as an O-ring is fitted in the annular groove 38. The resilient member 39 intervenes between an outer circumference of the first end portion 21 of the worm shaft 18 and an inner circumference of the greater diameter sleeve 35 of the joint 34. Thus, radial clearance (play) between the worm shaft 18 and the joint 34 is eliminated, while grease is prevented from leaking out of the sleeve 35.

As described above, the stop ring 40 is provided in the groove 21b of the worm shaft 18 on the right side of the inner ring 31 of the first bearing 23.

In accordance with this embodiment, when a biasing force is applied to the spline portion 21a on the first end portion 21 of the worm shaft 18 in the direction of the arrow X by the axially biasing means (e.g., compression coil spring 37), the biasing force is sequentially applied to the stop ring 40 and to the inner ring 31, rollers 49 and outer ring 25 of the first bearing 23. Thus, a preload is applied to the first bearing (ball bearing) 23 which supports the first end portion 21 of the worm shaft 18, whereby the internal clearance of the first bearing 23 is eliminated. Therefore, noises can be prevented which may otherwise occur due to the internal clearance of the first bearing 23.

Even if a less expensive sliding bearing is employed as the second bearing 24 for supporting the second end portion 22 of the worm shaft 18, a noise reduction effect can be provided, which is comparable to a case where a pair of ball bearings are employed for supporting the opposite ends of the worm shaft 18.

Figure 4:
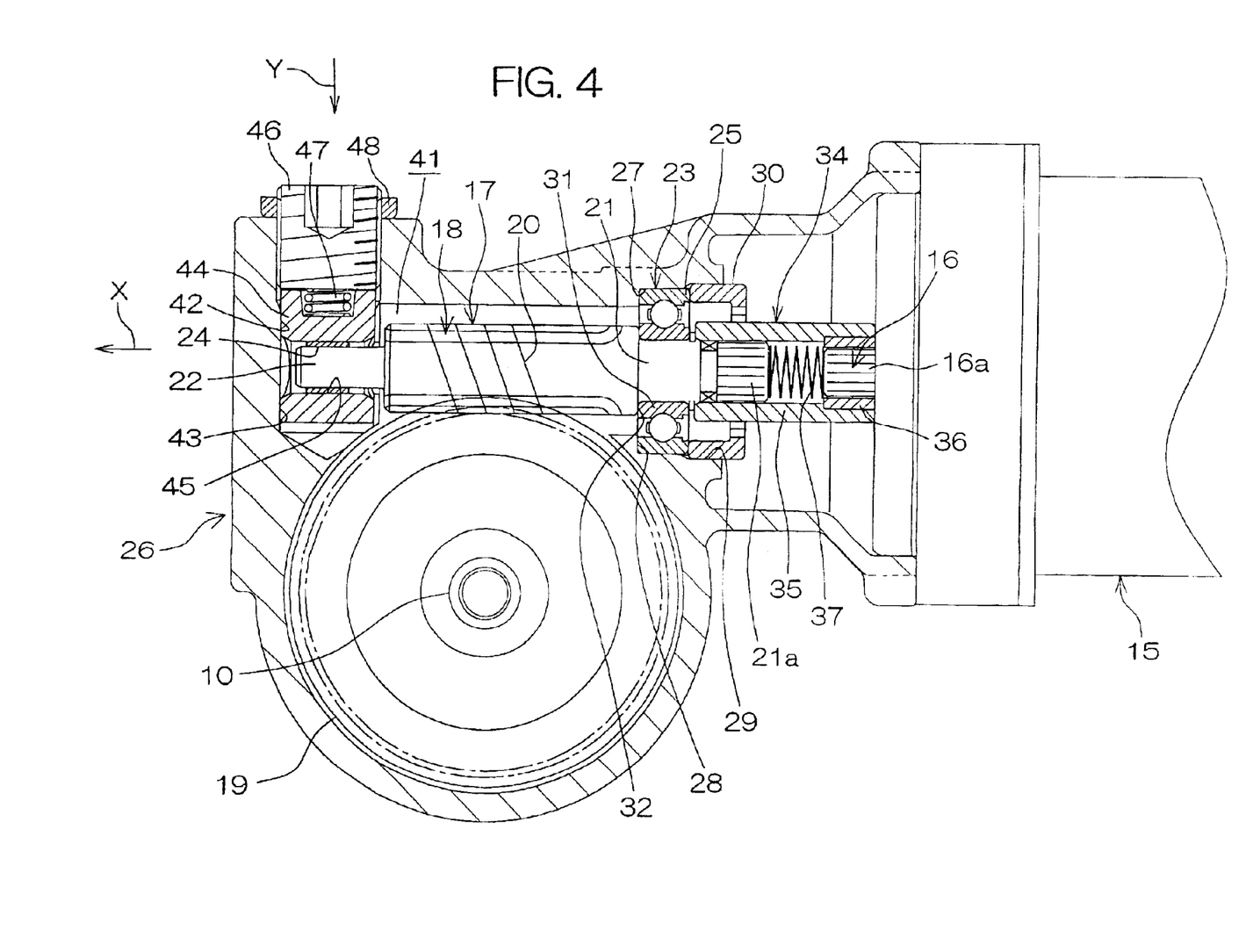
FIG. 4 is a sectional view illustrating a major portion of an electric power steering system according to another embodiment of the present invention.

FIG. 4 illustrates another embodiment of the present invention. Referring to FIG. 4, this embodiment differs from the embodiment shown in FIG. 2 in that a mechanism for radially biasing the second bearing 24 toward the worm wheel is additionally provided for elimination of backlash between the worm shaft 18 and the worm wheel 19.

A space 41 in the gear housing 26 accommodating the worm shaft 18 is open to the outside through a support hole 42 such as of a round shape extending radially of the second end portion 22 of the worm shaft 18. A cylindrical support member 44 which is slidable along the axis of the support hole 42 (vertically in FIG. 4) within the support hole 42 is fitted in a guide portion 43 at the bottom of the support hole 42 as shown in FIG. 4. The second bearing (metal bush) 24 is press-fitted in a bearing hole (lateral hole) 45 extending radially through the support member 44.

The second bearing 24 is guided by the guide portion 43, and movable together with the support member 44 toward and away from the worm wheel 19 within the support hole 42.

An adjustment bolt 46 is threaded with a thread portion provided in the vicinity of a mouth of the support hole 42 for closing the support hole 42. A radially biasing member (radially biasing means) 47 such as a compression coil spring is interposed between the adjustment bolt 46 and the support member 44 for biasing the second end portion 22 of the worm shaft 18 toward the worm wheel 19 via the support member 44. The position of the adjustment bolt 46 is adjusted and fixed by a lock nut 48.

In accordance with this embodiment, the second end portion 22 of the worm shaft 18 is biased radially of the worm shaft 18 toward the worm wheel 19 (in the direction of the arrow Y) by the radially biasing member 47, whereby the backlash between the worm shaft 18 and the worm wheel 19 can be eliminated.

Particularly, where such a backlash elimination mechanism is additionally provided, the second end portion 22 of the worm shaft 18 is radially movable. Accordingly, even if a ball bearing is employed as the second bearing 24, it is difficult to apply a preload to the ball bearing. Therefore, a sliding bearing or a cylindrical roller bearing is often employed as the second bearing 24 as in this embodiment, yet a sufficient noise reduction effect can be expected.

Instead of the compression coil spring 37 as the longitudinally biasing means in the embodiments shown in FIGS. 2 and 4, a spring 51, 52, 70 (53,54) or 71 (55,56,57) may be employed which is accommodated in the sleeve 35 in an embodiment as shown in FIG. 5A, 5B, 5C or 5D.

Figure 5A:
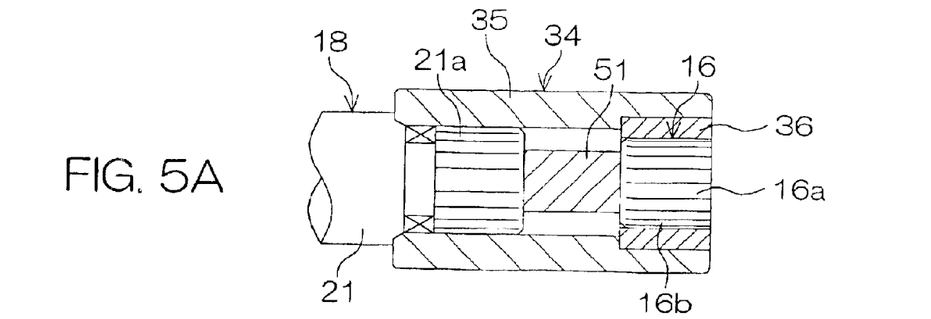
FIGS. 5A to 5D are sectional views of major portions of electric power steering systems according to other embodiments of the present invention, particularly illustrating modifications of longitudinally biasing means.

In the embodiment shown in FIG. 5A, a rod spring 51 such as of a cylindrical shape is employed. In the embodiment shown in FIG. 5B, a serial combination rod spring 52 of a two-stage cylindrical shape is employed which has a greater diameter rod spring 52a and a smaller diameter rod spring 52b.

Figure 5B:
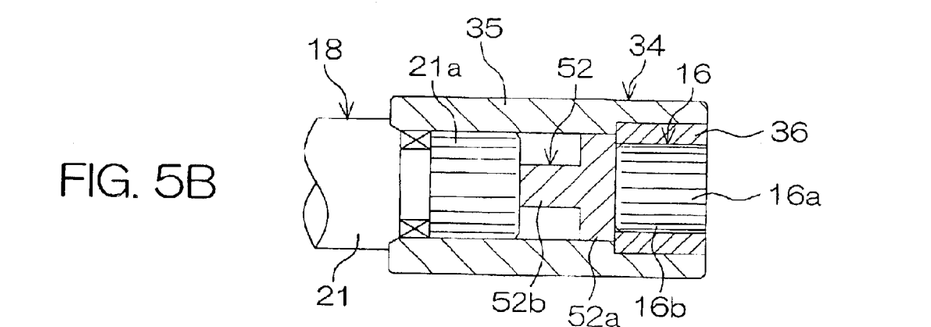

These rod springs 51, 52 are each composed of a synthetic rubber or a synthetic resin, and interposed between the first end 21 of the worm shaft 18 and the end 16a of the rotatable shaft 16 opposed to the first end 21.

The synthetic rubber or the synthetic resin of the rod springs 51, 52 serving as the longitudinally biasing means provides a vibration attenuation effect by its internal friction, thereby effectively reducing noises. Further, vibrations can be suppressed which may otherwise be conducted to the reduction gear mechanism 17 from the electric motor 15. Thus, noises due to the vibrations of the electric motor 15 can be reduced.

Figure 5C:
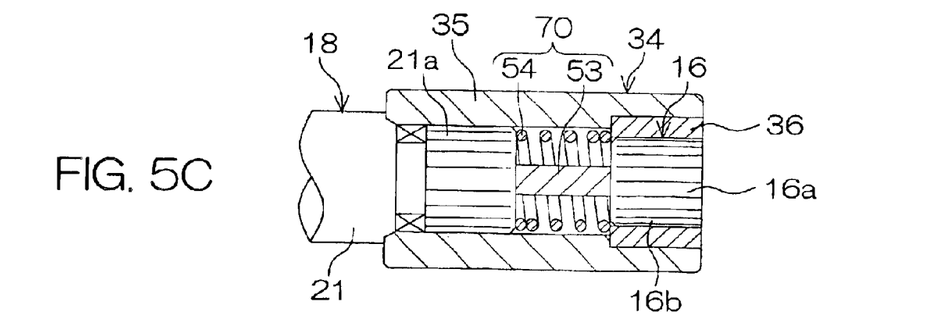

In the embodiment shown in FIG. 5C, the longitudinally biasing means includes a plurality of springs. More specifically, a parallel combination spring 70 including a rod spring 53 of a synthetic rubber or a synthetic resin having the same construction as the rod spring 51 shown in FIG. 5A and a metal compression coil spring 54 surrounding the rod spring 53 is employed as the axially biasing means.

The metal compression coil spring 54 mainly serves to provide a force to longitudinally bias the worm shaft 18, whereby the durability of the combination spring 70 is enhanced. The rod spring 53 of the synthetic rubber or the synthetic resin mainly functions as a damper to attenuate vibrations which may cause noises. Thus, both the durability and the noise reduction effect can be enhanced.

Figure 5D:
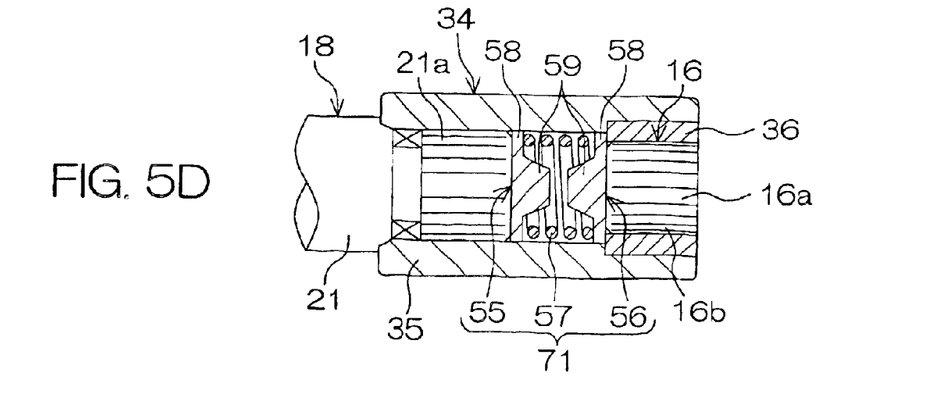

In the embodiment shown in FIG. 5D, a combination spring 71 including a pair of rod springs 55, 56 of a synthetic rubber or a synthetic resin each having a truncated cone shape and a metal compression coil spring 57 is employed as the longitudinally biasing means.

The rod springs 55, 56 have receiving seats 58 respectively abutting against the first end 21 of the worm shaft 18 and the end 16a of the rotatable shaft 16, and conical bodies 59 extending from the receiving seats 58. The compression coil spring 57 is interposed between the receiving seats 58 of the rod springs 55 and 56, and opposite ends of the compression coil spring 57 are received by the corresponding receiving seats 58. In an initial set state, a predetermined spacing is defined between opposed ends of the bodies 59 of the rod springs 55 and 56.

In the embodiment shown in FIG. 5D, both the durability and the noise reduction effect can be enhanced as in the embodiment shown in FIG. 5C. In addition, the compression coil spring 57 can stably be fitted in place and prevented from rattling, because the opposite ends of the compression coil spring 57 are respectively received by the receiving seats 58. Further, the compression coil spring 57 abuts against the receiving seats 58 of the synthetic rubber or the like, so that the noise reduction effect is advantageously enhanced.

It is noted that the rod springs 51, 52, 53, 55, 56 may be of a hollow shape.

Figure 6A:
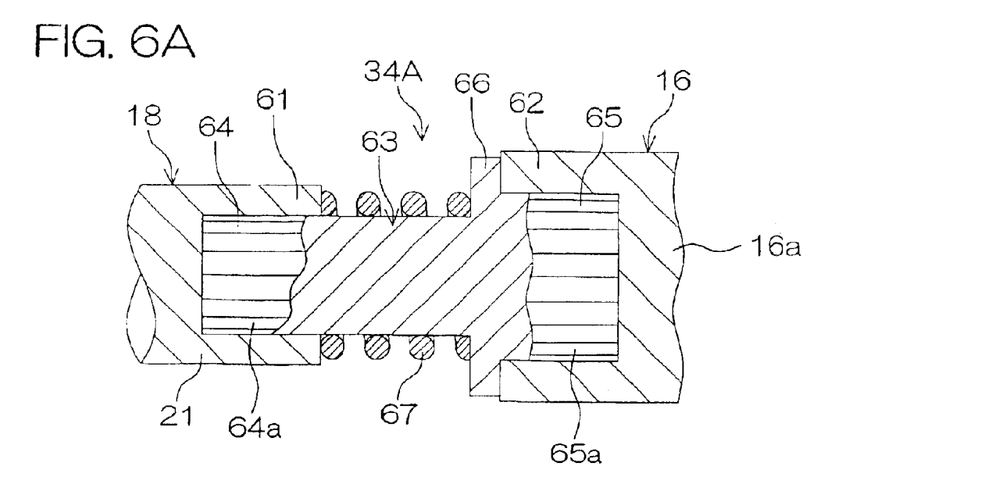
FIGS. 6A and 6B are sectional views of major portions of electric power steering systems according to other embodiments of the present invention, particularly illustrating modifications of a joint.

FIG. 6A illustrates another embodiment of the present invention. Referring to FIG. 6A, this embodiment has the following feature. A first sleeve 61 and a second sleeve 62 are provided in an opposed relation as respectively extending from the first end 21 of the worm shaft 18 and from the end 16a of the rotatable shaft 16 opposed to the first end 21. The sleeves 61, 62 are connected to each other via a drive shaft 63 to constitute a joint 34A. Serration portions 64a, 65a are provided around opposite end portions 64, 65 of the drive shaft 63. The end portions 64 and 65 are respectively fitted in the sleeves 61 and 62 in serration engagement with the sleeves 61 and 62.

The worm shaft 18 and the rotatable shaft 16 are coupled to each other in a co-rotatable manner via the joint 34A constituted by the drive shaft 63 and the first and second sleeves 61, 62, so that a driving force can be transmitted from the rotatable shaft 16 to the worm shaft 18.

An annular flange 66 is provided on a periphery of a longitudinal middle portion of the drive shaft 63. Longitudinally biasing means such as a compression coil spring 67 is provided between the annular flange 66 and an end face 61a of the first sleeve 61, and surrounds the drive shaft 63.

In this embodiment, the drive shaft 63 is permitted to be slightly inclined between the first and second sleeves 61 and 62, so that a misalignment between the sleeves 61 and 62 or a misalignment between the worm shaft 18 and the rotatable shaft 16 can be accommodated by the slight inclination. As a result, a clearance required for the serration engagement can be reduced, whereby the noises can be reduced and the durability of the components in serration engagement can be improved.

The compression coil spring 67 may be provided between the end faces of the first and second sleeves 61 and 62 without the provision of the annular flange 66.

Figure 6B:
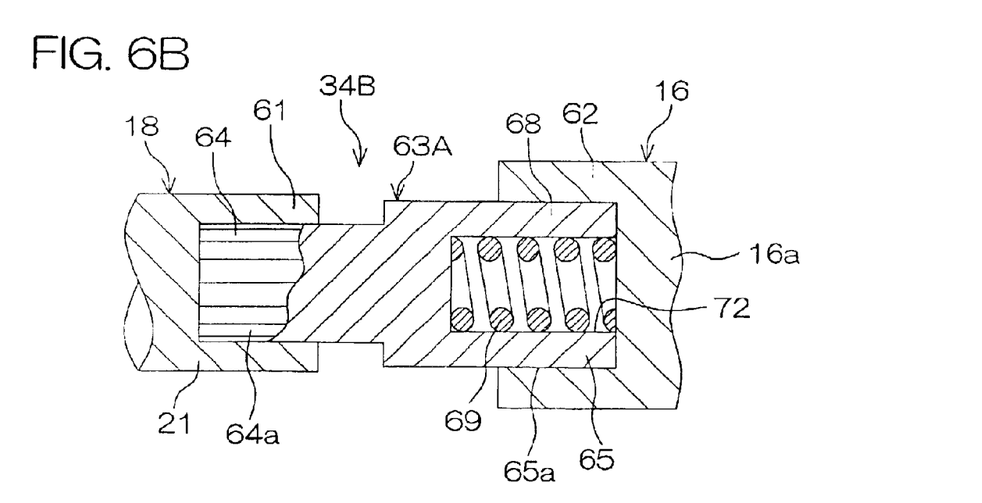

FIG. 6B illustrates further another embodiment of the present invention. Referring to FIG. 6B, this embodiment differs from the embodiment shown in FIG. 6A in that a joint 34B has a different construction from the joint 34A as will be described below. A drive shaft 63A includes a sleeve 68 having an open end 65, and axially biasing means such as a compression coil spring 69 is housed in a spring housing hole 72 within the sleeve 68. The compression coil spring 69 axially biases the worm shaft 18 via the drive shaft 63A. Thus, the same action and effect as in the embodiment shown in FIG. 6A can be provided in this embodiment.

Figure 7:
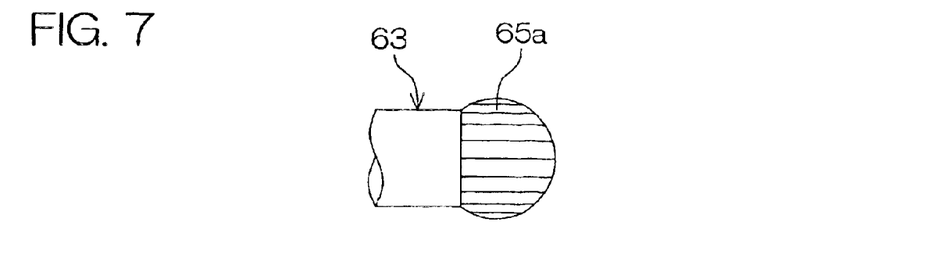
FIG. 7 is a side view of a drive shaft of a joint of an electric power steering system according to further another embodiment of the present invention.

In the embodiment shown in FIG. 6A or 6B, the serration portion 65a (or 64a) may have a round shape as shown in FIG. 7, so that the drive shaft 63 (or 63A) can easily be inclined.

In the embodiment shown in FIG. 6A or 6B, any of the longitudinally biasing means shown in FIGS. 5A to 5D may be employed in combination.

While the present invention has thus been described in detail by way of the specific embodiments thereof, those skilled in the art will easily come up with variations, modifications and equivalents of the embodiments in light of the disclosure. Therefore, it should be understood that the scope of the present invention be defined by the appended claims and their equivalents.

What is claimed is:

1. An electric power steering system, comprising:

a steering assist electric motor;

a reduction gear mechanism for reducing a rotation speed of a rotatable shaft of the electric motor, the reduction gear mechanism comprising a worm shaft driven by the rotatable shaft of the electric motor, and a worm wheel driven by the worm shaft;

a joint for coupling the rotatable shaft of the electric motor to the worm shaft for transmission of a driving force; and longitudinally biasing means, provided in association with the joint for longitudinally biasing the worm shaft;

wherein first and second sleeves are provided in an opposed relation as respectively extending from the first end portion of the worm shaft and from an end of the rotatable shaft of the electric motor located adjacent the first end portion;

wherein the joint comprises a joint having a drive shaft coupled to the first and second sleeves for transmission of a driving force;

wherein the drive shaft is in serration engagement with the first and second sleeves;

wherein the drive shaft comprises a drive shaft having a spring housing hole; and wherein the longitudinally biasing means comprises a spring housed in the spring housing hole.

2. An electric power steering system according to claim 1, wherein the spring comprises a combination spring having a non-linear spring characteristic.

3. An electric power steering system according to claim 2, wherein the combination spring comprises a rod spring composed of a synthetic rubber or a synthetic resin, and a metal compression coil spring provided parallel to the rod spring.

4. An electric power steering system according to claim 2, wherein the combination spring comprises a rod spring composed of a synthetic rubber or a synthetic resin and having a greater diameter portion and a smaller diameter portion.

* * * * *